(12) United States Patent
Holzinger et al.

(10) Patent No.: US 10,837,649 B2
(45) Date of Patent: Nov. 17, 2020

(54) CONTROL UNIT FOR A DOMESTIC APPLIANCE

(71) Applicant: ELECTROLUX APPLIANCES AKTIEBOLAG, Stockholm (SE)

(72) Inventors: Jochen Holzinger, Rothenburg ob der Tauber (DE); Harald Hoffmann, Rothenburg ob der Tauber (DE); Juergen Leikam, Rothenburg ob der Tauber (DE)

(73) Assignee: Electrolux Appliances Aktiebolag, Stockholm (SE)

( * ) Notice: Subject to any disclaimer, the term of this patent is extended or adjusted under 35 U.S.C. 154(b) by 354 days.

(21) Appl. No.: 15/737,526

(22) PCT Filed: Jun. 10, 2016

(86) PCT No.: PCT/EP2016/063321
§ 371 (c)(1),
(2) Date: Dec. 18, 2017

(87) PCT Pub. No.: WO2017/008964
PCT Pub. Date: Jan. 19, 2017

(65) Prior Publication Data
US 2018/0180293 A1    Jun. 28, 2018

(30) Foreign Application Priority Data

Jul. 10, 2015    (EP) .................................... 15176186

(51) Int. Cl.
*F24C 7/08*    (2006.01)
*G06F 3/0488*    (2013.01)
(Continued)

(52) U.S. Cl.
CPC .............. *F24C 7/086* (2013.01); *F24C 7/083* (2013.01); *F24C 7/085* (2013.01); *G06F 3/0416* (2013.01);
(Continued)

(58) Field of Classification Search
CPC .......... F24C 7/086; F24C 7/083; F24C 7/805; G06F 3/0416; G06F 3/0482;
(Continued)

(56) References Cited

U.S. PATENT DOCUMENTS 6,097,016 A * 8/2000 Hirata ................. H05B 6/6435
219/720
2007/0062739 A1    3/2007 Philipp et al.
(Continued)

FOREIGN PATENT DOCUMENTS

CN        1714191 A       12/2005
CN       102356280 A       2/2012
(Continued)

OTHER PUBLICATIONS

EP2211117—English Translation, machine generated Jan. 2020 (Year: 2020).*
(Continued)

*Primary Examiner* — Benjamin R Shaw
(74) *Attorney, Agent, or Firm* — Pearne & Gordon LLP

(57) ABSTRACT

The present invention relates to a control unit (10) for a domestic appliance, in particular for a cooking appliance. The control unit (10) comprises at least one display (12) formed as an input-output device. At least a part of the display (12) is touch-sensitive and/or formed as a touch screen. The display (12) is switchable between a control mode and an information mode. The display (12) includes at least one area (16). In the control mode the area (16) illustrates symbols and/or touch switches for controlling the (Continued)

Figure 1:
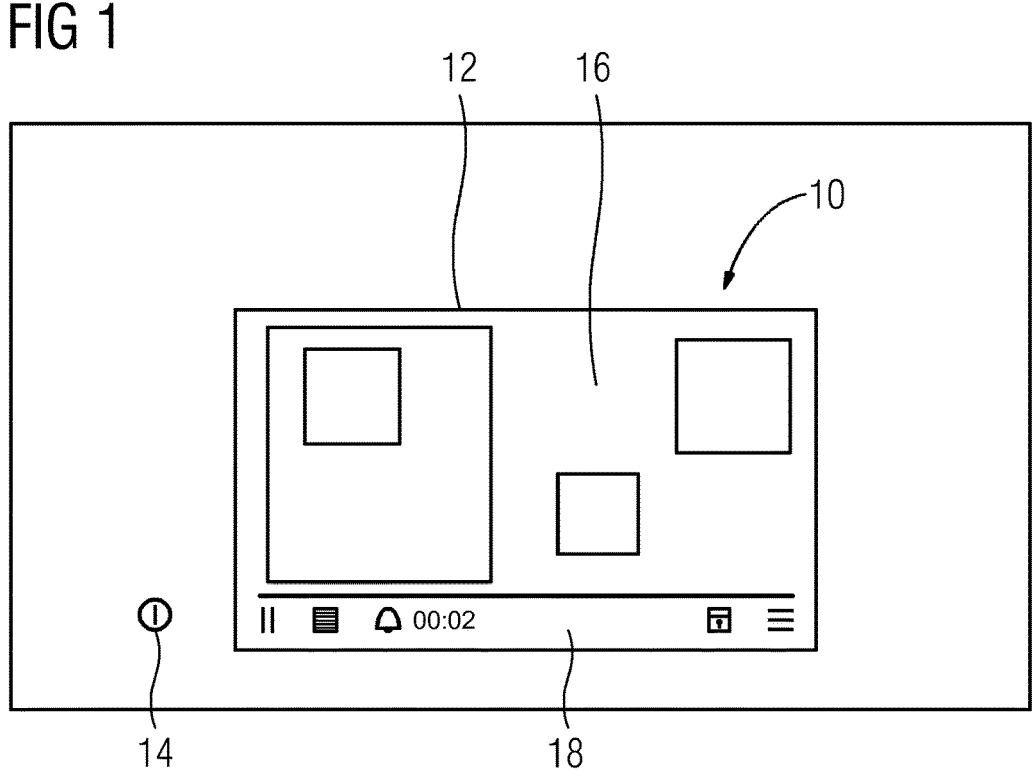

domestic appliance by a user. In the information mode the area (16) illustrates information as a two-dimensional representation for the user. The representation of information on the at least one area (16) is controlled or controllable by symbols and/or touch switches on said area (16). The control unit (10) includes a switch button (20) for switching over between the control mode and the information mode.

19 Claims, 5 Drawing Sheets

(51) Int. Cl.
*G06F 3/0484* (2013.01)
*G06F 3/041* (2006.01)
*G06F 3/0482* (2013.01)

(52) U.S. Cl.
CPC .......... *G06F 3/0482* (2013.01); *G06F 3/0484* (2013.01); *G06F 3/0488* (2013.01); *G06F 3/04845* (2013.01); *G06F 3/04886* (2013.01); *G06F 2203/04806* (2013.01)

(58) Field of Classification Search
CPC .. G06F 3/0484; G06F 3/04845; G06F 3/0488; G06F 3/04886; G06F 2203/04806
See application file for complete search history.

(56) References Cited

U.S. PATENT DOCUMENTS

| | | | | |
|---|---|---|---|---|
| 2013/0038840 A1* | 2/2013 | Hoffmann | ............... | F24C 7/082 353/28 |
| 2013/0056457 A1* | 3/2013 | Lee | ............... | F24C 7/083 219/620 |
| 2013/0204406 A1* | 8/2013 | Andersson | .......... | A47L 15/4293 700/83 |
| 2014/0201664 A1* | 7/2014 | Guilleminot | ......... | H05B 1/0263 715/771 |
| 2014/0201688 A1* | 7/2014 | Guilleminot | ............ | G06F 3/017 715/863 |
| 2015/0192302 A1* | 7/2015 | Ortner | ..................... | F24C 7/085 99/332 |
| 2017/0285926 A1* | 10/2017 | Brasseur | ................. | D06F 58/28 |
| 2017/0292712 A1* | 10/2017 | Alexander | ............. | F24C 7/086 |
| 2019/0120498 A1* | 4/2019 | Zanchetta | ................ | A21B 7/00 |

FOREIGN PATENT DOCUMENTS

| | | | | |
|---|---|---|---|---|
| CN | 104094217 A | 10/2014 | | |
| DE | 102008032452 | 1/2010 | | |
| EP | 2211117 | 7/2010 | | |
| EP | 2211117 A1 * | 7/2010 | ................ | F24C 7/08 |
| EP | 2573470 | 3/2013 | | |
| KR | 1020060111004 | 10/2006 | | |

OTHER PUBLICATIONS

Office action issued in corresponding Chinese Patent Application No. 201680036905.1 dated Dec. 19, 2018, 7 pages.

International Search Report and Written Opinion for PCT/EP2016/063321 dated Nov. 28, 2016, 10 pages.

EP Office action for application No. EP15176186.3 dated Apr. 2, 2020, 6 pages.

\* cited by examiner

CONTROL UNIT FOR A DOMESTIC APPLIANCE

The present invention relates to a control unit for a domestic appliance. In particular, the present invention relates to a control unit for a cooking appliance. Further, the present invention relates to a domestic appliance, in particular a cooking appliance comprising at least one control unit.

For a domestic appliance, in particular a cooking appliance, information relating to said domestic appliance may be provided by software. The representation of information is realized by an appropriate display. For example, a mobile computer device comprises application software for downloading and presenting cooking recipes on a display. Further, the mobile computer device may be provided for controlling the cooking appliance.

It is an object of the present invention to provide a control unit for a domestic appliance, wherein said control unit allows the presentation of information by low complexity.

The present invention relates to a control unit for a domestic appliance, in particular for a cooking appliance, wherein
- the control unit comprises at least one display formed as an input-output device,
- at least a part of the display is touch-sensitive and/or formed as a touch screen,
- the display is switchable between a control mode and an information mode,
- the display includes at least one area,
- in the control mode the area illustrates symbols and/or touch switches for controlling the domestic appliance by a user,
- in the information mode the area illustrates information as a two-dimensional representation for the user,
- the representation of information on the area is controlled or controllable by at least one symbol and/or touch switch on said area, and
- the control unit includes a switch button for switching over between the control mode and the information mode.

The main idea of the present invention is that a predetermined area of the touch screen is alternating used as control area for the domestic appliance and as output device for information. The switch button allows a simple switching over between the control mode and the information mode of the control unit. The multiple use of the touch screen minimizes the complexity of the control unit.

Preferably, the display includes at least one further area representing at least one symbol and/or touch switch for controlling the control unit and/or the domestic appliance by the user in the control mode and in the information mode. The further area of the display allows that some operations may be performed by the user, when the touch screen is in the information mode.

In particular, the further area of the display remains unchanged, when the display is switched between the control mode and the information mode. The further area of the display guarantees that some operations may be always performed by the user.

For example, the switch button is a touch switch.

Preferably, the touch switch is arranged within the further area of the display. The user can always switch over between the control mode and the information mode.

In particular, the two-dimensional representation of information includes text, one or more pictures and/or one or more symbols. For example, the display may represent information which is conventionally provided in paper form.

Further, the control unit may comprise at least one slide function, so that the two-dimensional representation of information is moveable upwards, downwards and/or sidewards within the area.

Moreover, the control unit may comprise at least one zoom function, so that the two-dimensional representation of information is enlargeable and/or scalable within the area.

For example, information representable on the area is stored or storable in at least one memory of the control unit or the domestic appliance.

Alternatively or additionally, the control unit is connected or connectable to the internet, so that information is downloadable or downloaded from the internet to the control unit. The information downloaded may be stored in the memory of the control unit or the domestic appliance, so that the user may select said information at a later date.

The control unit may be connected or connectable to the internet via a local area network and/or a wireless local area network.

Furthermore, the control unit may be connected or connectable to a mobile computer device, so that information is transferable from said mobile computer device to the control unit.

Additionally, the control unit may comprise an on-off switch, wherein preferably said on-off switch is arranged outside and/or besides the touch screen.

According to a preferred embodiment, the domestic appliance is a cooking appliance, wherein the display is switchable between a cooking mode and a recipe mode, and wherein the switch button is a recipe button for switching over between the cooking mode and the recipe mode, and wherein preferably the recipe button is arranged within the further area of the touch screen.

Further, the domestic appliance may be a cooking hob, wherein the display is an integrated part of a cooking panel.

Moreover, the complete display may be formed as a touch screen.

At last, the present invention relates to a domestic appliance, in particular a cooking appliance comprising at least one control unit mentioned above.

Novel and inventive features of the present invention are set forth in the appended claims.

Figure 2:
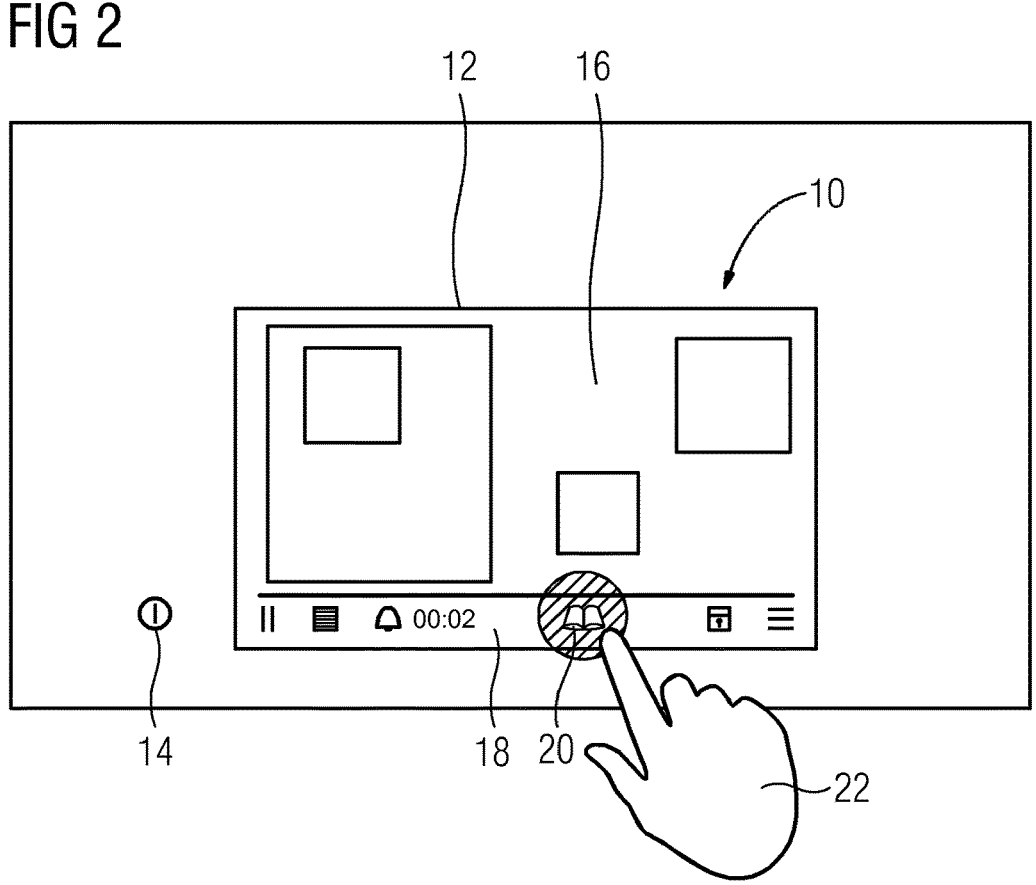
Figure 3:
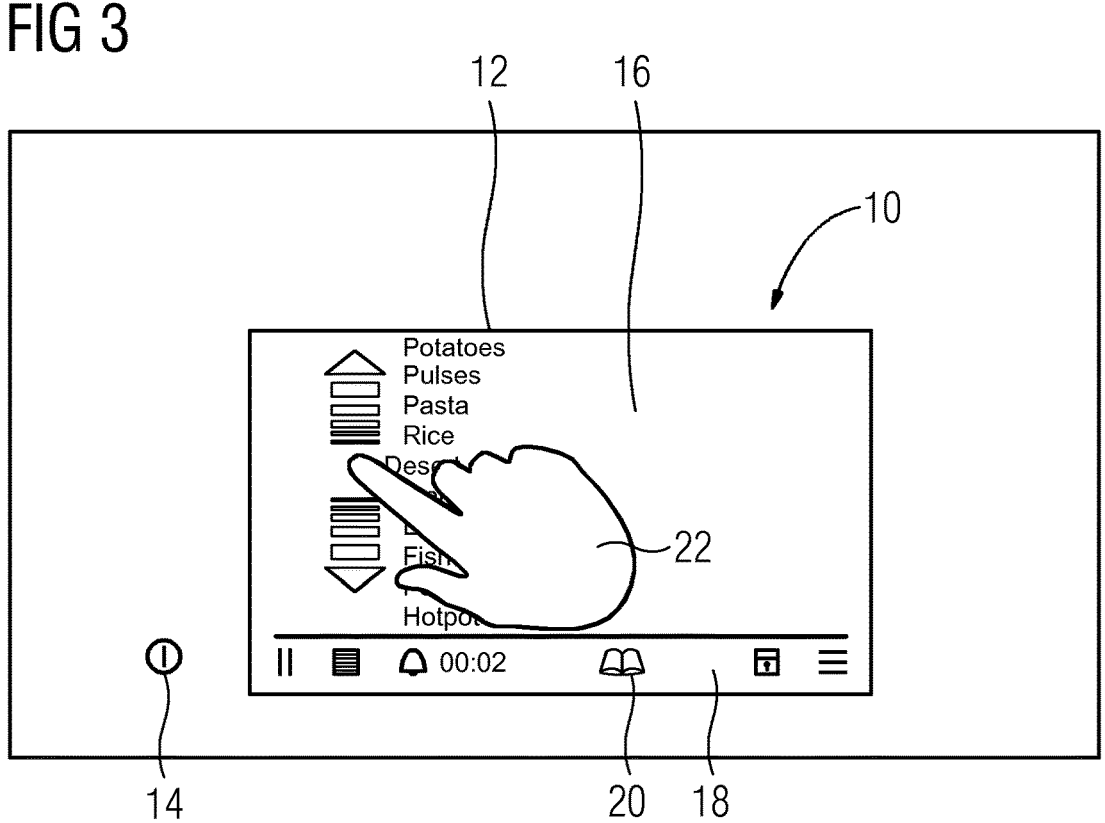
Figure 4:
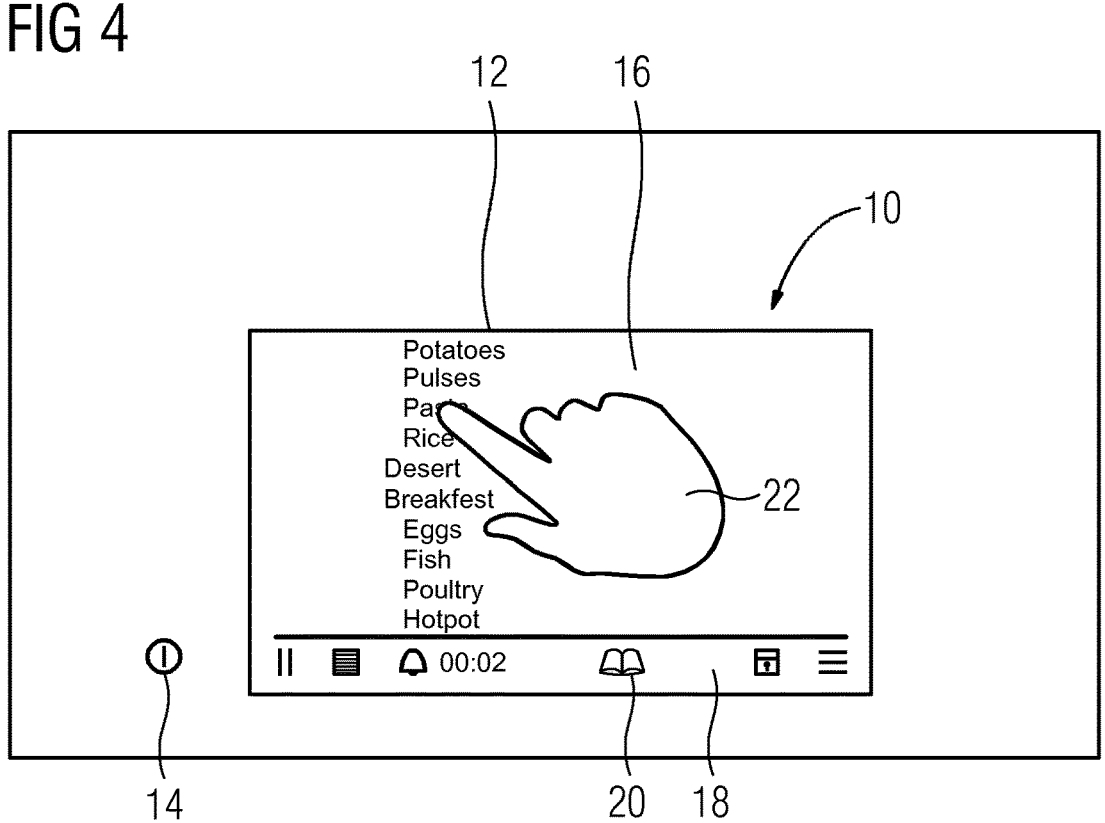
Figure 5:
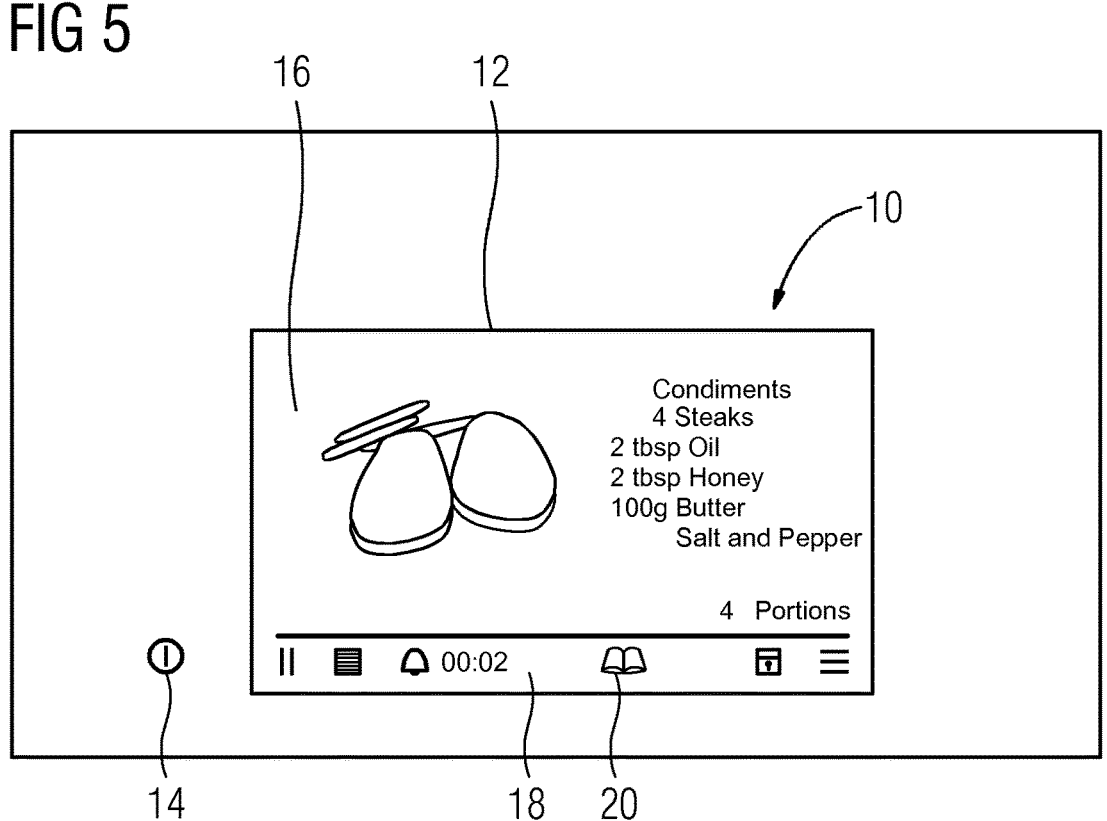
Figure 6:
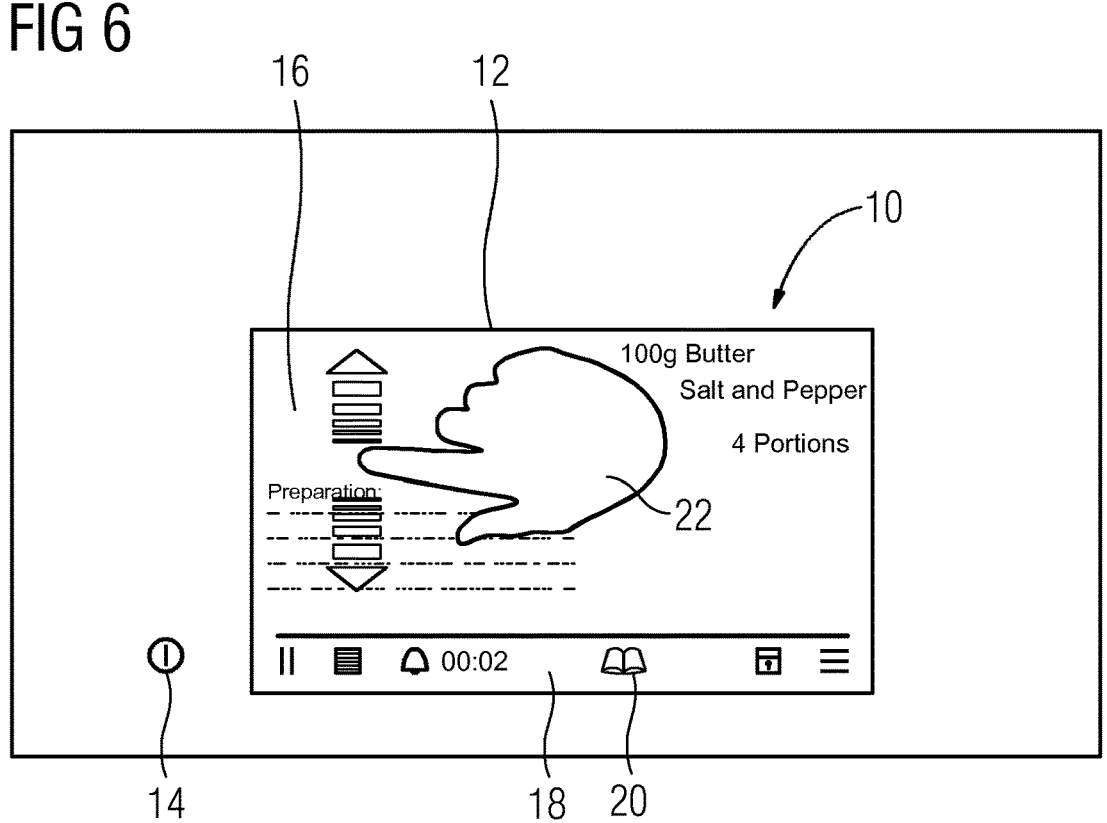
Figure 7:
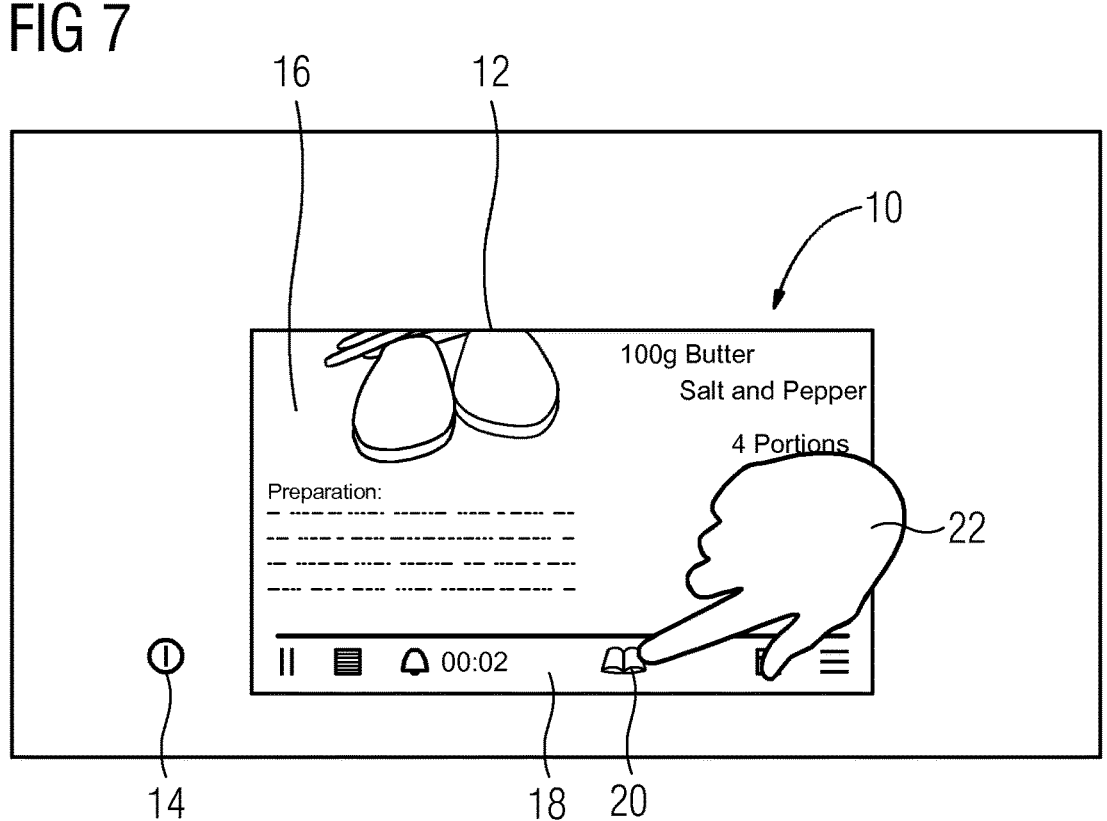
Figure 8:
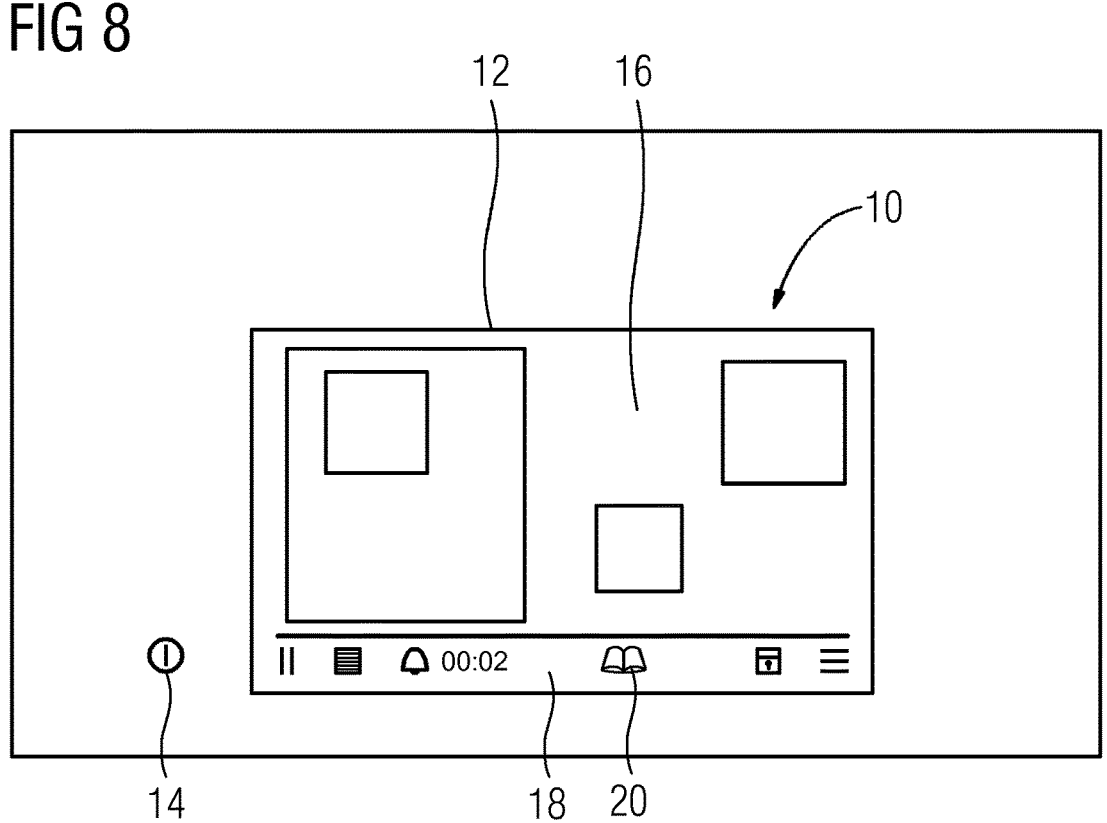
Figure 9:
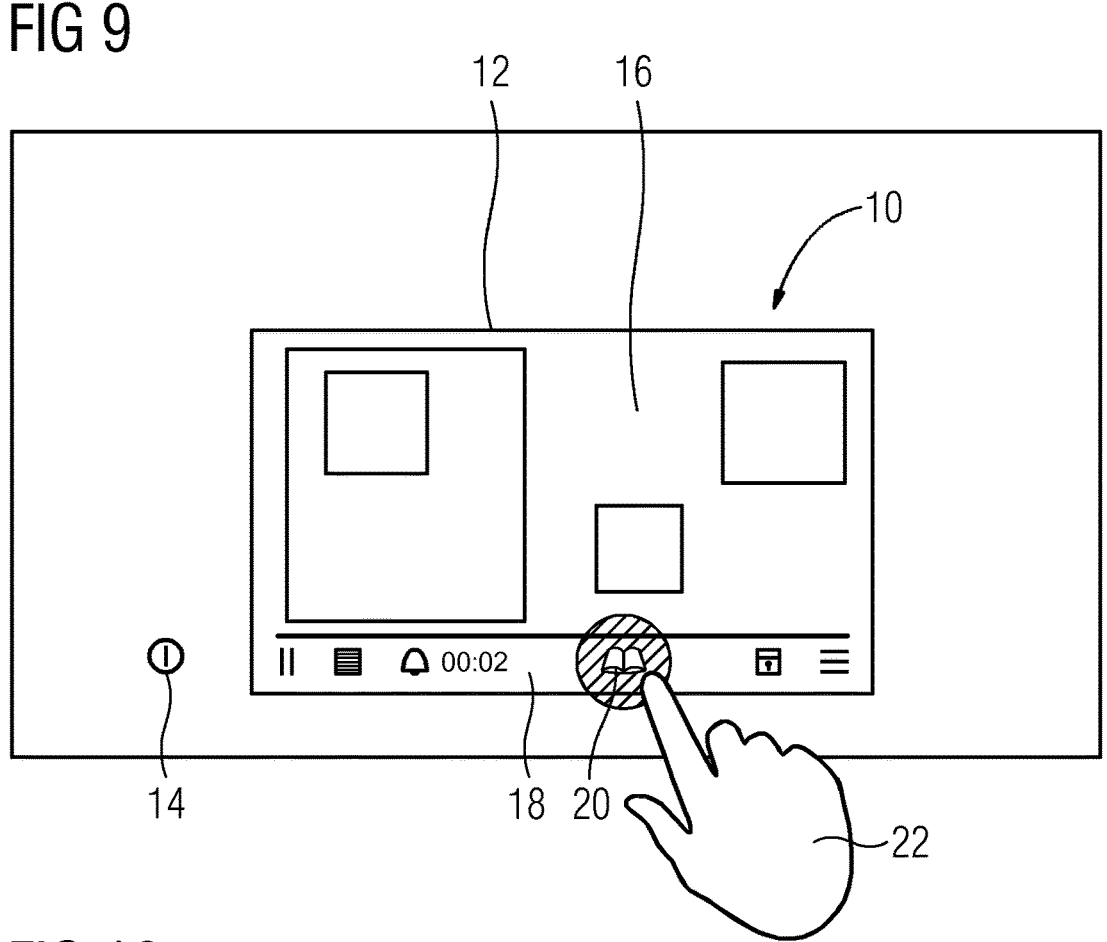
Figure 10:
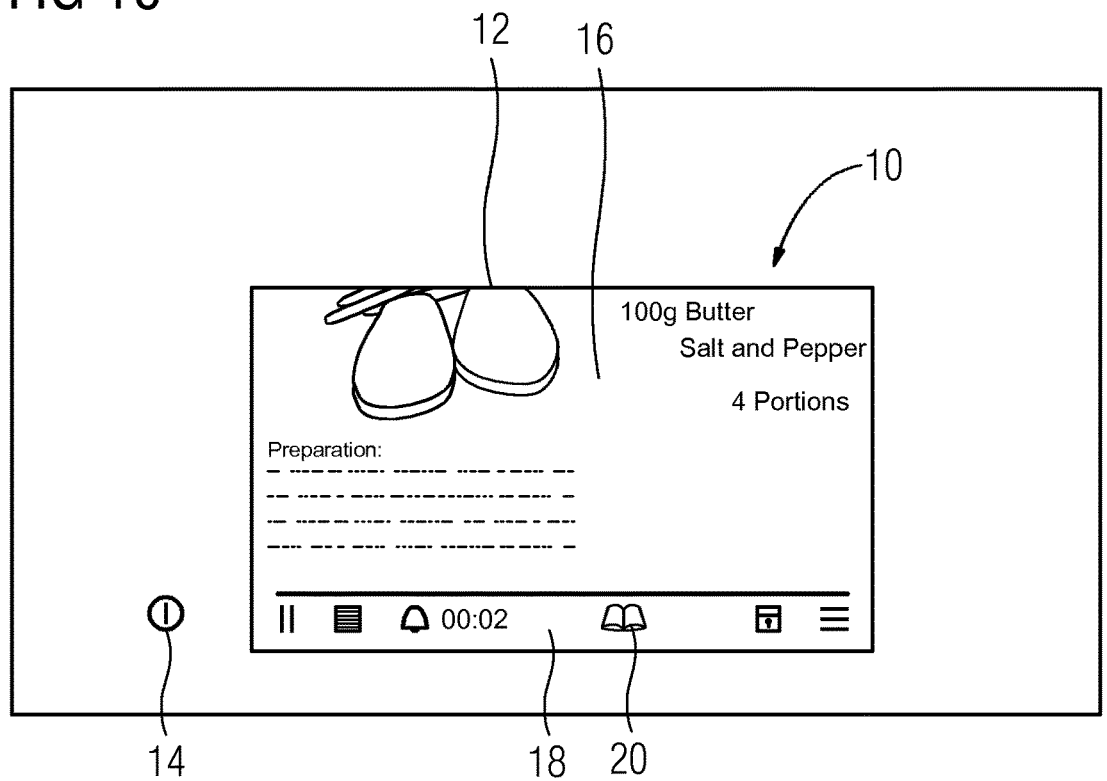

The present invention will be described in further detail with reference to the drawing, in which FIG. 1 illustrates a schematic view of a user interface of a cooking hob according to the prior art, FIG. 2 illustrates a schematic view of the user interface of the cooking hob according to a preferred embodiment of the present invention, FIG. 3 illustrates a schematic view of the user interface of the cooking hob according to the preferred embodiment of the present invention, wherein a recipe mode is activated, FIG. 4 illustrates a schematic view of the user interface of the cooking hob according to the preferred embodiment of the present invention, wherein a menu item of cooking recipes is displayed, FIG. 5 illustrates a schematic view of the user interface of the cooking hob according to the preferred embodiment of the present invention, wherein a selected cooking recipe is displayed, FIG. 6 illustrates a schematic view of the user interface of the cooking hob according to the preferred embodiment of the present invention, wherein a further part of the selected cooking recipe is displayed, FIG. 7 illustrates a schematic view of the user interface of the cooking hob according to the preferred embodiment of the present invention, wherein the further part the selected cooking recipe is displayed, FIG. 8 illustrates a schematic view of the user interface of the cooking hob according to the preferred embodiment of the present invention, wherein the user interface is in the cooking mode again, FIG. 9 illustrates a schematic view of the user interface of the cooking hob according to the preferred embodiment of the present invention, wherein the user interface is still in the cooking mode, and FIG. 10 illustrates a schematic view of the user interface of the cooking hob according to the preferred embodiment of the present invention, wherein the selected cooking recipe is displayed again.

FIG. 1 illustrates a schematic view of a user interface 10 of a cooking hob according to the prior art. In this example, the user interface 10 comprises a touch screen 12 and an on-off switch 14. In general, the user interface 10 comprises a display 12 and the on-off switch 14, wherein at least a part of the display 12 is touch-sensitive and/or formed as touch screen. The touch screen 12 is an input-output device for controlling the cooking hob. In this example, the touch screen 12 is rectangular. The on-off switch 14 is arranged besides the touch screen 12 and provided for activating and deactivating the cooking hob.

The touch screen 12 includes a first area 16 and a second area 18. In this example, the first area 16 forms a bigger part of the touch screen 12, while the second area 18 forms a remaining small part of said touch screen 12. The first area 16 includes symbols representing cooking zones of the cooking hob. For example, said cooking zones are activated, controlled and/or deactivated by touching the corresponding symbols on the first area 16. The second area 18 includes symbols for controlling the cooking hob. The symbols on the second area 18 are provided for displaying states of the cooking hob and/or as touch switches for controlling the cooking hob. For example, the second area 18 includes a timer.

FIG. 2 illustrates a schematic view of the user interface 10 of the cooking hob according to a preferred embodiment of the present invention. The user interface 10 of the present invention is similar to the user interface 10 according to the prior art shown in FIG. 1.

Additionally, the user interface 10 according to the present invention includes a recipe button 20. Said recipe button 20 is provided for switching over between a cooking mode and a recipe mode. The recipe button 20 is arranged in the second area 18 of the user interface 10. In FIG. 2 the user interface 10 is in the cooking mode, wherein the symbols representing the cooking zones are shown in the first area 16 of the user interface 10. The recipe button 20 is a touch switch and operable by the user's hand 22.

FIG. 3 illustrates a schematic view of the user interface 10 of the cooking hob according to the preferred embodiment of the present invention, wherein a recipe mode is activated. The recipe mode has been activated by touching the recipe button 20.

In the recipe mode an electronic cookbook is represented in the first area 16 of the touch screen 12. In the second area 18 of the touch screen 12 the same symbols are represented in the recipe mode as well as in the cooking mode. Thus, the recipe button 20 is visible and operable in the cooking mode and in the recipe mode. Also the other symbols of the second area 18 remain visible and/or operable in the cooking mode and in the recipe mode.

In FIG. 3 a welcome page of the recipe mode displays a menu item of cooking recipes. A number of recipes are listed and may be selected by touching the corresponding position on the first area 16 of the touch screen 12. In the recipe mode an electronic cookbook is readable by the user. The first area 16 of the touch screen 12 acts as an e-book reader.

FIG. 4 illustrates a schematic view of the user interface 10 of the cooking hob according to the preferred embodiment of the present invention, wherein the menu item of cooking recipes is displayed. FIG. 4 demonstrates how a certain recipe is selected by the user. Said certain recipe is selected by the user and the corresponding position is touched by the user's hand 22.

FIG. 5 illustrates a schematic view of the user interface 10 of the cooking hob according to the preferred embodiment of the present invention, wherein a selected cooking recipe is displayed. Said cooking recipe has been selected by the user before. The represented cooking recipe includes a picture showing the dish and a table of the condiments and their amounts.

FIG. 6 illustrates a schematic view of the user interface 10 of the cooking hob according to the preferred embodiment of the present invention, wherein a further part of the selected cooking recipe is displayed. In the recipe mode the first area 16 of the touch screen 12 comprises a slide function, so that the representation of the selected cooking recipe may be moved upwards and downwards. Alternatively or additionally, the representation of the selected cooking recipe may be moved sidewards. In FIG. 6 the first area 16 of the touch screen 12 represents an instruction for the preparation of the dish. In this example, the instruction is represented in written text.

The cooking recipes may also include data for adjusting the heating elements. For example, said data include the position and/or the operation mode of the heating element. Further, the data may include the temperature and/or the power level of the heating element. Moreover, the data may include the cooking time for performing the cooking recipe. For example, the data for adjusting the heating element are transferred to said heating element by actuating a button of the user interface 10, wherein preferably the heating element is started by further actuating said button or another button.

If a first step of the cooking recipe is performed, then preferably the data for a second step are automatically transferred to the heating element and/or to another heating element, wherein the heating element or heating elements for said second step are started by actuating a button of the user interface 10 by the user. More generally, if a current step of the cooking recipe is performed, then preferably the data for a subsequent step are automatically transferred to one or more corresponding heating elements, wherein the heating element or heating elements for said subsequent step are started by actuating a corresponding button of the user interface 10 by the user.

FIG. 7 illustrates a schematic view of the user interface 10 of the cooking hob according to the preferred embodiment of the present invention, wherein the further part of the selected cooking recipe is displayed. In FIG. 7 the first area 16 of the touch screen 12 shows also the instruction for the preparation of the dish. The second area 18 of the touch screen 12 includes the recipe button 20. A touch of the recipe button 20 by the user's hand 22 effects switching over from the recipe mode to the cooking mode again.

FIG. 8 illustrates a schematic view of the user interface 10 of the cooking hob according to the preferred embodiment of the present invention, wherein the user interface 10 is in the cooking mode again. The cooking mode has been activated again by the touch of the recipe button 20 by the user's hand 22. The user may control the cooking zones represented by the symbols on the first area 16 of the user interface 12 in the cooking mode.

FIG. 9 illustrates a schematic view of the user interface 10 of the cooking hob according to the preferred embodiment of the present invention, wherein the user interface is still in the cooking mode. The second area 18 of the touch screen 12 includes the recipe button 20. A further touch of the recipe button 20 by the user's hand 22 effects switching over from the cooking mode to the recipe mode again.

FIG. 10 illustrates a schematic view of the user interface 10 of the cooking hob according to the preferred embodiment of the present invention, wherein the selected cooking recipe is displayed again. The recipe mode is activated again, after the recipe button 20 has been touched by the user's hand 22.

The presentations in FIG. 7 to FIG. 10 clarify the switching over between the recipe mode and the cooking mode by touching the recipe button 20 by the user's hand 22. The user can easily switch over between the recipe mode and the cooking mode. The is first area 16 of the touch screen 12 acts as an e-book reader for the cookbook on the one hand and as a control device of the cooking zones on the other hand.

According to an alternative embodiment of the present invention the user interface includes a graphic display formed as an output device and an input device arranged out of said graphic display. For example, the input device includes a touch area or at least one adjusting knob. Thus, in the alternative embodiment the input device and the output device of the user interface are separate parts. In the information mode the graphic display may indicate a menu of cooking recipes, wherein one of said cooking recipes may be selected by an actuation of the adjusting knob or by contacting the touch area. Then, the selected cooking recipe is indicated by the graphic display, wherein preferably said cooking recipe includes the picture showing the dish and/or the table of the condiments and/or their amounts. In the control mode the graphic display may indicate current parameter values of the cooking process by symbols, numbers and/or letters. Said parameter values may be adjusted or changed by actuating the touch area or the adjusting knob of the input device by the user.

The user interface according to the present invention includes an integrated electronic cookbook. Said electronic cookbook is easy to handle and read. The user does not need any cookbook in paper form. For example, the cooking recipes are stored in a memory of the user interface 10, so that the user may select and read the cooking recipe all the time.

Further, the cooking recipes may be downloaded from the internet by the user. For example, the user interface 10 and/or the cooking hob are connected or connectable to the internet via a local area network (LAN) or a wireless local area network (WLAN). According to another example, a mobile computer device is connected or connectable to the internet via the wireless local area network (WLAN) or a mobile communications network, while the user interface 10 and/or the cooking hob are connected or connectable to said mobile computer device via a standardized wireless or wiring connection. For example, a Bluetooth connection may be used between the user interface 10 and/or the cooking hob on the one side and the mobile computer device on the other side. The cooking recipes may be downloaded from the homepage of the producer of the cooking hob or from a homepage related to cooking recipes. The cooking recipes downloaded may also be stored in the memory of the user interface 10, so that the user may select and read the cooking recipe downloaded at a later date.

The user interface 10 mentioned above is provided for the cooking hob. Further, the user interface 10 may be also provided for a cooking oven and a microwave oven. Moreover, the user interface 10 may be provided for other domestic appliances, wherein arbitrary instructions or information for the user are represented by the user interface 10.

Although an illustrative embodiment of the present invention has been described herein with reference to the accompanying drawing, it is to be understood that the present invention is not limited to that precise embodiment, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS 10 user interface
12 touch screen, display
14 on-off switch
16 first area of the touch screen
18 second area of the touch screen
20 recipe button
22 user's hand

The invention claimed is:

1. A control unit for a domestic appliance, wherein
the control unit comprises at least one display formed as an input-output device,
at least a part of the display is touch-sensitive and/or formed as a touch screen,
the display is switchable between a control mode and an information mode,
the display includes at least one area,
in the control mode the area illustrates symbols and/or touch switches for controlling the domestic appliance by a user,
in the information mode the area illustrates information as a two-dimensional representation for the user,
the representation of information on the area is controlled or controllable by at least one symbol and/or touch switch on said area, and
the control unit includes a switch button for switching over from the control mode to the information mode and from the information mode to the control mode.

2. The control unit according to claim 1, wherein the display includes at least one further area representing at least one symbol and/or touch switch for controlling the control unit and/or the domestic appliance by the user in the control mode and in the information mode.

3. The control unit according to claim 2, wherein the further area of the display remains unchanged when the display is switched between the control mode and the information mode.

4. The control unit according to claim 1, wherein the switch button is a touch switch arranged within the further area of the display.

5. The control unit according to claim 1, wherein the two-dimensional representation of information includes text, one or more pictures and/or one or more symbols.

6. The control unit according to claim 1, wherein the control unit comprises at least one slide function, so that the two-dimensional representation of information is moveable upwards, downwards and/or sidewards within the area.

7. The control unit according to claim 1, wherein the control unit comprises at least one zoom function, so that the two-dimensional representation of information is enlargeable and/or scalable within the area.

8. The control unit according to claim 1, wherein information representable on the area is stored or storable in at least one memory of the control unit or of the domestic appliance.

9. The control unit according to claim 1, wherein the control unit is connected or connectable to the internet, so that information is downloadable or downloaded from the internet to the control unit via a local area network (LAN) and/or a wireless local area network (WLAN).

10. The control unit according to claim 1, wherein the control unit is connected or connectable to a mobile computer device, so that information is transferable from said mobile computer device to the control unit.

11. The control unit according to claim 1, wherein the control unit comprises an on-off switch arranged outside and/or besides the display.

12. The control unit according to claim 1, wherein the domestic appliance is a cooking appliance, wherein the display is switchable between a cooking mode and a recipe mode, and wherein the switch button is a recipe button for switching over between the cooking mode and the recipe mode, and wherein the recipe button is arranged within the further area of the display.

13. The control unit according to claim 12, wherein the domestic appliance is a cooking hob, wherein the display is an integrated part of a cooking panel.

14. The control unit according to claim 1, wherein the display is formed as a touch screen.

15. A domestic appliance, comprising at least one control unit according to claim 1.

16. A cooking appliance comprising a heating element for cooking food and a control unit for controlling the heating element, said control unit comprising a touch-screen interface having a first area and a further area, a recipe touch button disposed in said further area for switching said first area between a cooking mode and a recipe mode, wherein in said cooking mode said first area displays symbols representing features of the cooking appliance that can be controlled by a user touching the corresponding symbol on said first area, and wherein in said recipe mode said first area displays a digital cookbook comprising a plurality of recipes, each said recipe being selectable by a user touching an associated recipe name in a list of recipes displayed in said first area to thereby call up the associated recipe to be displayed in said first area, the associated recipe comprising a first page displayable in said first area listing a table of condiments and their amounts for said recipe, and a second page displayable in said first area containing instructions for preparation of said recipe from said condiments, said recipe further comprising control data for adjusting said heating element to cook food according to said recipe, said control unit being configured to automatically adjust said heating element according to said control data based on said recipe, said first area in said recipe mode comprising a slide function so that a representation of said recipe can be moved upwards and downwards and/or side-to-side, and a zoom function so that said representation of said recipe can be enlarged in said first area, wherein said further area continues to display buttons and/or information pertaining to the operation of said cooking appliance, including said recipe button, in both said cooking mode and said recipe mode, said first area being switchable between said cooking mode and said recipe mode at any time by actuating said recipe button.

17. The cooking appliance according to claim 16, said control unit being connectable to the internet and/or to a mobile computer device to download additional recipes into said digital cookbook.

18. The cooking appliance according to claim 16, said control data comprising power-level and cooking-time data for operating said heating element to prepare food according to said recipe, wherein said automatic adjustment of said heating element is started by a user actuating a touch button on said touch-screen interface.

19. The cooking appliance according to claim 16, said touch-panel interface being formed as an integral part of a cooking panel of a cooking hob of the appliance.

* * * * *